March 15, 1966 R. JAHN 3,240,542
ROLLER THRUST BEARING
Filed Feb. 18, 1963 2 Sheets-Sheet 1

INVENTOR
RUDOLF JAHN

BY Mestern, Ross & Mestern

March 15, 1966 R. JAHN 3,240,542
ROLLER THRUST BEARING
Filed Feb. 18, 1963 2 Sheets-Sheet 2

INVENTOR
RUDOLF JAHN 3,240,542
ROLLER THRUST BEARING
Rudolf Jahn, Herzogenaurach, near Nurnberg, Germany, assignor to Industriewerk Schaeffler, Herzogenaurach, near Nurnberg, Germany, a corporation of Germany
Filed Feb. 18, 1963, Ser. No. 259,323
Claims priority, application Germany, Feb. 20, 1962, J 21,322
4 Claims. (Cl. 308—235)

My present invention relates to a thrust bearing in which a set of cylindrical rollers or needles, radially disposed in an annular array around an axis, are rotatably held in an annular cage therefor.

Thrust bearings of this type have heretofore been relatively complex, compared with journal-type roller bearings, because it was erroneously assumed that the radially oriented rollers required considerably stronger forces than do axially disposed rollers in order to hold them in position. Prior designs of thrust bearings have, therefore, been relatively bulky, heavy and wasteful of material.

The general object of my present invention is to provide a thrust bearing of the character set forth in which these drawbacks are avoided and which can be economically produced from relatively thin sheet material (e.g. sheet steel) by conventional manufacturing techniques.

A more specific object of this invention is to provide a novel type of cage for such bearings in which each roller is held with at least linear contact, in contradistinction to the point-contact engagement afforded by earlier constructions, so that both rollers and the cage will wear less rapidly and the life span of these parts will be considerably increased.

It is also an object of my invention to provide a cage for the purpose described which can be made in a single piece by mass-production sheet-working processes such as punching and, thereafter, deformation by bending or swaging without further removal of material.

The foregoing objects are realized, in accordance with this invention, by the provision of a cage of sheet material having an annular body with a flat base formed with an array of radially extending webs, the latter having laterally projecting lugs which form roller-engaging edges extending approximately radially along generatrices of imaginary cylindrical surfaces (i.e. the surfaces of the rollers to be engaged thereby) on opposite sides of the common axial plane of the rollers. Thus, each web is advantageously of generally trapezoidal configuration, the inclined sides of the trapezoid being formed by web portions which connect a pair of transverse lugs at the ends of the web, on the level of the base, with an intermediate transverse lug at the center of the web, lying at a predetermined elevation from the base. In order to reduce friction and wear, I prefer to offset the roller-engaging lug edges from the connecting web portions to such an extent that these portions are not contacted by the rollers; on the other hand, the rollers should have a diameter greater than the width of the cage (as measured in the axial direction of the annular array) so that the rollers will project beyond the webs, on either or both sides of the cage, in the direction of the axis of rotation on which the annular body is centered.

The cylindrical shape given to the rollers in a thrust bearing according to my invention is a distinct advantage from a production point of view. Because of this shape, however, abutments must be provided to prevent the rollers from slipping out axially (e.g. under the urging of centrifugal forces) from their seats between adjoining webs with which they are interleaved. To this end I prefer to provide the annular cage body with a pair of concentric upstanding flanges integral with its base, the separation of these flanges being slightly greater than the length of the rollers which accordingly are not materially impeded thereby in their rotation. Either or each of these flanges may, pursuant to a further feature of my invention, be doubled back upon itself or bent over in a direction away from the rollers for purposes of reinforcement or to form a ring of suitable diameter adapted to be secured to a concentric shaft, tube or other construction element supporting the thrust bearing.

The above and other objects, features and advantages of my invention will become more fully apparent from the following detailed description of certain embodiments, reference being made to the accompanying drawing in which.

Figure 1:
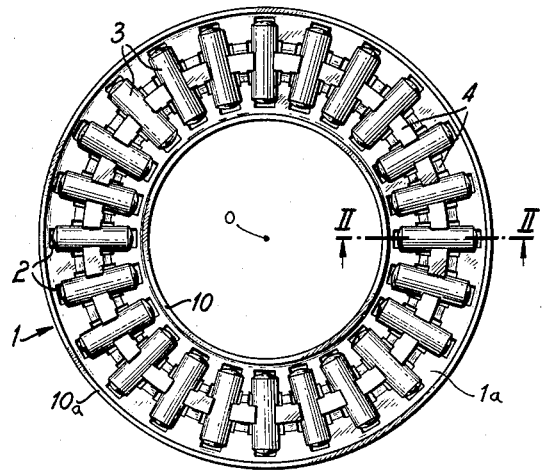
FIG. 1 is a plan view of a thrust bearing employing the invention.
Figure 2:
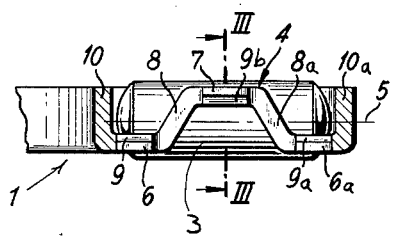
FIG. 2 is a fragmentary cross-sectional view taken (with omission of a roller) substantially on the line II—II of FIG. 1, but drawn to a larger scale.
Figure 3:
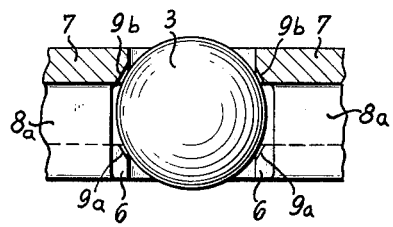
FIG. 3 is a further enlarged cross-sectional view taken on the line III—III of FIG. 2.

The thrust bearing shown in FIGS. 1–3 comprises a cage 1 with a flat annular base 1a which lies in a plane transverse to the axis O on which it is centered. Base 1a, which consists of sheet metal, is formed with a series of peripherally equispaced radial cutouts 2 between which there are left a like number of radial webs generally designated 4. Each web 4 is bent out of the plane of base 1a so as to have a raised central portion 7 connected by inclined limbs 8, 8a with the end portions 6, 6a of the web. The limbs 8, 8a and the center portion 7 define the sides and the minor base of a trapezoid whose altitude is bisected by a horizontal line 5 representing the common axial plane of an array of radially extending cylindrical rollers 3 which are lodged in the cutouts 2. It will be noted from FIGS. 2 and 3 that the diameters of the rollers 3 are greater than the height of the web 4, and of the cage 1 as a whole, so that the rollers project both upwardly and downwardly (i.e. in the direction of the cage axis O) beyond the end faces of the cage. These end faces are defined by the underside of base 1a and by the tops of a pair of concentrice annular flanges 10, 10a which rise integrally from the base to the level of the central web part 7 and form abutments for the cylindrical rollers 3 whose length is slightly less than the separations of these flanges. End portions 6 and 6a, lying in the plane of base 1a, may also be regarded as confronting tongues extending outwardly and inwardly from inner ring 10 and outer ring 10a, respectively, these tongues being integrally bridged by the trapezoidal web portions 8, 7, 8a.

The web portions 6, 6a and 7 are formed as transverse lugs projecting laterally beyond the connecting limbs 8, 8a as best seen in FIG. 3. These lugs 6, 6a, 7 are provided with concave faces 9, 9a, 9b which are closely spaced from the associated roller 3 and substantially conform to its peripheral surface, being themselves at least approximately in the shape of segments of an imaginary cylindrical surface which are centered on the roller axis and whose generatrices, therefore, extend substantially radially of the array of webs 4. They contact the roller at least at one longitudinal edge, i.e. their trailing edge as seen in the direction of roller rotation, and may even slightly diverge from the roller surface in a direction away from that trailing edge (thus opposite the sense of rotation) so as to facilitate the entry of wedge-shaped layers of lubricant between the roller and its guide surfaces. As FIG. 3 shows, the contact faces 9, 9a, 9b are so disposed with reference to the connecting web portions 8, 8a as to hold the latter somewhat spaced from the roller.

The aforementioned imaginary cylindrical surfaces are of a diameter slightly larger than the height of the trapezoidal web portions 8, 7, 8a so that, as clearly seen in FIGS. 2 and 3, the rollers 3 project axially beyond the webs.

It will thus be apparent that the arrangement described and illustrated maintains a definite relative positioning between the annular array of radial rollers 3 and the cage 1 in which they are journaled. The rollers are positively guided by the edges of lugs 6, 6a, 7 over a considerable part of their own length, yet are engaged only along a small fraction of their peripheral surface so that friction is minimized.

Figure 4:
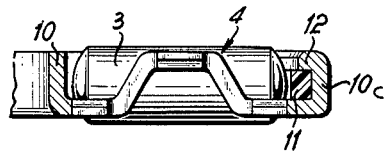
FIGS. 4–7 are further views similar to FIG. 2, illustrating a variety of modifications.

In some instances, particularly where the cage 1 is designed to rotate at high speed, the rollers 3 may be urged with considerable centrifugal force against the confining outer annular flange. In such cases is will be desirable to strengthen this outer flange, e.g. in the manner shown in FIG. 4 where the flange 10c is formed with an inward bead 12 engaging a reinforcing strip 11. This strip, inserted between the flange 10c and the rollers 3, may consist of a suitable plastic material, preferably one with a low frictional coefficient such as Teflon.

Figure 5:
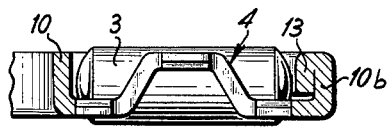

An alternative way of reinforcing the outer flange has been illustrated in FIG. 5 where the flange 10b has been doubled back upon itself so as to have an additional thickness 13.

It will also sometimes be necessary to alter the effective diameter of either or both flanges independently of the length of the rollers to facilitate the mounting of the cage on a central shaft, in a tubular housing or on some other complementary part.

Figure 6:
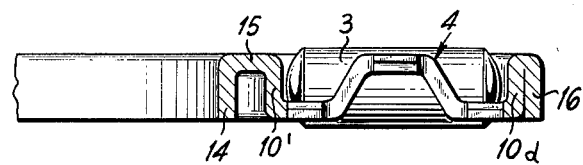
Figure 7:
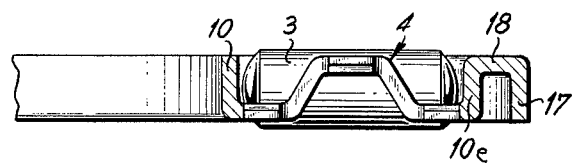

FIG. 6 shows how, for this purpose, the inner flange 10' may be extended to form a concentric ring 14 integrally joined to the flange at 15. This figure also shows the outer flange 10d reinforced by an extension 16 bent back unto it. Such reinforcement will generally not be necessary in the construction illustrated in FIG. 7 where the outer flange 10e has a concentric ring 17 integrally connected with it by an annular extension 18.

It will be apparent that the rollers 3 should be inserted into their seats before the shaping of the cage is completed, e.g. before either or both flanges such as 10, 10a are formed thereon.

Various other modifications of the system herein disclosed are, of course, possible without departing from the spirit and scope of my invention as defined in the appended claims.

I claim:

1. A thrust-bearing cage comprising an annular body of sheet material with a flat base disposed substantially in a plane perpendicular to the axis of said body and with an annular array of radially extending webs rising integrally from said base with substantially uniform peripheral spacing, said webs having laterally projecting lugs disposed on the level of said base at the ends of said webs and at a predetermined elevation from said base at the center of said webs, lugs having cylindrically concave faces whose generatrices extend substantially radially of the array and which constitute portions of imaginary cylindrical surfaces conforming to the peripheries of rollers radially insertable in the spaces between adjoining webs, said imaginary cylindrical surfaces projecting beyond said webs in the axial direction of said body, said body further comprising two concentric annular flanges rising integrally from said base on opposite sides of said webs, at least the outer one of said flanges being provided with reinforcing means on its side facing the opposite flange, said reinforcing means comprising an annular strip of low-friction solid material.

2. A thrust-bearing cage comprising an annular body of sheet material with an inner ring and an outer ring spacedly centered on an axis, said rings being provided with confronting radially separated tongues disposed at peripherally equispaced locations in a plane perpendicular to said axis, said body further including an annular array of radially extending webs bridging respective pairs of confronting tongues and rising integrally therewith from said plane in substantially trapezoidal form, each of said tongues having a pair of oppositely projecting lateral lugs in said plane, each of said webs having a pair of oppositely projecting lateral lugs above said plane on the minor base of the trapezoid, said lugs having cylindrically concave faces whose generatrices extend substantially radially of the array and which constitute portions of imaginary cylindrical surfaces substantially conforming to the peripheries of rollers radially insertable into the spaces between adjoining webs, said imaginary cylindrical surfaces having diameters slightly longer than the height of said trapezoid whereby said rollers upon their insertion project beyond said webs in the direction of said axis, said lugs projecting sufficiently beyond said webs and tongues to prevent contact thereof with said rollers upon their insertion except at the concave faces of said lugs.

3. A cage as defined in claim 2 wherein at least the outer one of said rings is provided with reinforcing means on its side facing the opposite ring.

4. A cage as defined in claim 3 wherein said reinforcing means comprises an integral annular flange extension folded inwardly against the ring.

References Cited by the Examiner

UNITED STATES PATENTS

| 1,053,413 | 2/1913 | Lockwood | 308—235 |
|---|---|---|---|
| 2,038,095 | 4/1936 | Bott | 308—201 |
| 2,848,791 | 8/1958 | Neese | 29—148.4 |
| 3,091,500 | 5/1963 | Alston | 308—217 |

FOREIGN PATENTS

| 1,023,932 | 2/1958 | Germany. |
|---|---|---|
| 1,099,809 | 2/1961 | Germany. |
| 449,513 | 6/1936 | Great Britain. |

DON A. WAITE, *Primary Examiner.*

ROBERT C. RIORDON, *Examiner.*